US008978279B1

(12) United States Patent
Pentland

(10) Patent No.: US 8,978,279 B1
(45) **Date of Patent: *Mar. 17, 2015**

(54) METHOD AND APPARATUS FOR PRODUCING KINETIC IMAGERY

(71) Applicant: Joseph C. Pentland, Bridgeport, CT (US)

(72) Inventor: Joseph C. Pentland, Bridgeport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,766

(22) Filed: Sep. 30, 2013

Related U.S. Application Data

(60) Continuation of application No. 13/556,946, filed on Jul. 24, 2012, now Pat. No. 8,544,199, which is a division of application No. 12/642,375, filed on Dec. 18, 2009, now Pat. No. 8,230,625.

(51) Int. Cl.
*C09F 7/00* (2006.01)
*G09F 19/02* (2006.01)

(52) U.S. Cl.
CPC .................................... *G09F 19/02* (2013.01)
USPC ............................... 40/427; 40/429; 254/275

(58) Field of Classification Search
USPC ........................................................... 40/427
See application file for complete search history.

(56) References Cited

U.S. PATENT DOCUMENTS

2007/0205405 A1 * 9/2007 Stockmaster et al. ........ 254/275

OTHER PUBLICATIONS

BMW AG, Detailed project description for Kinetic Sculpture, Jun. 21, 2008, 2 pages, BMW Museum, Munich, Germany, downloaded from <http://www.artcom.de/index.php?lang=en&oplion=com_acprojects&id=62&Itemid= 144&page=6>.*

* cited by examiner

*Primary Examiner* — Casandra Davis
(74) *Attorney, Agent, or Firm* — Drinker Biddle & Reath LLP

(57) ABSTRACT

An apparatus for repetitively lifting and lowering objects to create visual patterns having a plurality of units each with a motor, a rotary member, a cord attached at its distal end to the circumferential edge of the rotary member, an attaching mechanism affixed to the proximal end of the cord, and an object removably connected to the attaching mechanism. A computer or microprocessor is provided and programmed to selectively rotate the rotary members to move the objects between selected pre-determined positions along a generally vertical path of travel to establish a geometric pattern of repetitive elements.

6 Claims, 10 Drawing Sheets

METHOD AND APPARATUS FOR PRODUCING KINETIC IMAGERY

CROSS-REFERENCE TO RELATED PATENT APPLICATIONS

This patent application is a continuation of copending U.S. patent application Ser. No. 13/556,946, filed Jul. 24, 2012, which is a divisional of U.S. Pat. No. 8,230,625 issued Jul. 31, 2012, the contents of which are incorporated by reference herein.

FIELD OF THE INVENTION

This invention relates generally to positioning multiple objects in a space and, more particularly, to methods and apparatus for moving multiple objects in space in unique new ways to create kinetic imagery.

BACKGROUND OF THE INVENTION

From almost the inception of kinetic art, people have been interested in moving objects in space and time in order to create visual effects. For centuries, this art form relied on human/solar/wind/magnetic powered motion. For most of the twentieth century it has been limited primarily to single speed art pieces. While more complex kinetic art became possible when transmissions could be used to vary speed, still kinetic art pieces have been limited to a discreet small number of speeds.

BRIEF SUMMARY OF THE INVENTION

This invention involves an apparatus for repetitively lifting, lowering and, optionally, swinging and/or dropping repetitive elements to create visual patterns in space and in time. In one embodiment, the device includes multiple units each comprising a motor and an associated computer or microprocessor to control the rotation of the motor shaft. A rotary member such as a pulley wheel having a circumferential edge is mounted or affixed to the motor shaft so that the circumferential edge of the rotary member is generally perpendicular to the axis of the shaft and a cord is attached at its distal end to the circumference of the rotary member. At its proximal end, the cord is affixed to an attaching mechanism. Finally, the attaching mechanism is attached to a repetitive element.

The attaching mechanism could include but is not limited to a magnet (where the repetitive element is ferromagnetic), a properly weighted and sized suction cup (where the repetitive element has a surface that is suction cup attachable), or Velcro® or other hook and loop attachment means (where the repetitive element is hook and loop attachable). In the discussion below, an attaching mechanism comprising a magnet and an associated repetitive unit which is ferromagnetic are described for purposes of illustration of the invention.

The apparatus of the invention comprises at least two units that raise and lower a plurality of repetitive elements at any desired speed along their paths of travel from a base height to a height adjacent the rotary member or to any predetermined position therebetween. Preferably, the apparatus will include three or more such units, each associated with its own ferromagnetic (or non-ferromagnetic) repetitive element. The plurality of units may be arranged in any regular shape or configuration such as, for example, a circle, a line, an arc, a rectangle, etc., or in any desired irregular geometric shape or configuration.

Additionally, because the velocity and acceleration/deceleration of the attaching mechanism and repetitive element are controlled instantaneously, the velocities of the attaching mechanism and repetitive elements can be varied during the raising/lowering process to achieve precise synchronization between repetitive elements. By synchronizing the rate of movement within one unit to the adjacent unit (or units), the illusion of direct interconnection between some or all of a plurality of repetitive elements may be achieved. Thus, the programming of the computer/microcontroller combined with the placement of the units relative to each other, makes it possible to produce myriad different visual shapes and patterns in both two and three dimensions.

For example, if all of a series of repetitive elements begin at base height=0 and unit 1 is programmed to lift repetitive element 1 to height h at velocity v at time t=0 ms, and unit 2 is programmed to lift repetitive element 2 at velocity v at time t=10 ms, unit 3 is programmed to lift repetitive element 3 at velocity v at time t=20 ms, and so on the viewer will see a diagonal line of repetitive elements all moving up at the same speed. By reversing the direction of rotation of the rotary members of each unit as soon as its repetitive element reaches height h, the diagonal line momentarily becomes an inverted "V", before becoming a diagonal line of repetitive elements moving down. Thus, by controlling the speeds and heights of the repetitive elements, a wide variety of different visual patterns may be produced. Also, if the diameter of the cord is kept small enough to be invisible from the viewing distance it will appear that the repetitive elements are freely moving in space.

Additionally, where the repetitive elements, are, e.g., ferromagnetic spheres and the spheres are attached to the cord by an appropriately strong magnet, the spheres can be made to release from their respective magnets. This can be done by positioning a blocking means about the cord, such as a hollow funnel with the smaller opening of the funnel closest to the pulley so that the cord can freely move up and down through the smaller opening in the funnel. The larger opening of the funnel will be large enough to receive at least a top portion of the sphere and its smaller opening will be large enough for the magnet to pass through but smaller in diameter than the diameter of the sphere. At the base height, directly below the funnel, a receptacle such as a bucket will be positioned, preferably centered and with padding in its bottom to minimize bounce of the sphere when it lands in the bucket. This gives the a unit the ability to drop its ball any time the motor lifts the sphere/magnet all the way to height h=hm, because only the magnet can actually reach hm, and the sphere and magnet will be separated inside the funnel (or below other blocking means), as the magnet ascends through the upper opening of the funnel since the funnel precludes further upward movement of the sphere. Once the ball is released from the magnet, it will freefall into the (padded) bucket below, where it will wait to be retrieved the next time the magnet returns to h=0.

In another embodiment, a member guide with a small hole larger than the diameter of the cord just above the funnel (or other blocking means) and/or just below the rotary member will do more than just stabilize the cord/magnet/sphere—it will also serve as a pivot point. Calling this small opening pivot point m, if h=0 represents the base height of the installation, then at h=x (x>0), an electromagnet may be attached to a linear actuator, with a pull length p (0<p<h) and a pull direction generally perpendicular to the line of units and to the axis of travel of the cord.

The computer/microprocessor will control the linear actuator with conventional software using conventional techniques, preferably through a closed-loop system that ensures that the linear actuator is moved exactly the amount desired. The electromagnet will also be computer controlled, such that it can be switched on and off at any pre-determined time. This added feature now allows the ferromagnetic sphere to be raised or lowered to h=x and attached to the electromagnet (assuming it is switched on). Once attached to the electromagnet, the linear actuator now has the ability to pull the electromagnet/sphere to any distance between 0 and p. If a stepper motor is used to control the amount of cord released/unwound from the rotary member, the cord can be kept taut at all times regardless of the pull distance of the linear actuator. With the linear actuator having moved, the sphere no longer resides directly below the pivot point m, so, at any time the controller indicates, the electromagnet can be switched off and the sphere released to let it swing in a pendulum motion about the pivot point m. Strategically attaching and releasing multiple units' repetitive elements (spheres) from their associated electromagnets, each with an individual linear actuator pull length, interesting and unique patterns can be created with the swinging pendulum motion. Even more interesting patterns can be created by lifting/lowering the swinging spheres to vary the pendulum periodicity. And finally, very little energy is lost to friction, etc., allowing the pendulum to swing for extended periods of time. In fact, because the length of the pendulum is known, the motor can be used as a driver of the pendulum by simply lifting and lowering the pendulum unit slightly at the appropriate times (in the same fashion that lifting and lowering one's legs at the appropriate times allows one to swing higher and higher).

Another embodiment of the invention includes lighting. Consider, for example, the above embodiment where the repetitive element can act as a pendulum whose initial motion is controlled by the linear actuator/electromagnet. In this embodiment, the cord is replaced with a conducting wire. This allows many different kinds of lights to be attached at the bottom end of the conducting wires. With a light attached (appropriately secured and encased) and a ferromagnetic element (attachable to the electromagnet) appropriately placed next to the light, now the linear actuator/electromagnet can pull back and release the light, allowing it to swing back and forth. Adding multiple units would create a visual effect like a programmable swinging chandelier. Additionally, the conducting wire may be in a preformed coil configuration, so that it is coiled/uncoiled repeatedly as it is attached and detached from the ferromagnetic element, allowing even more interesting patterns to be created as now it is possible also to change the periodicity of the swinging lights by changing the pendulum length. Alternatively, a low power light source, for example a high-output LED, would be encased (along with batteries to power them) inside a translucent container at the bottom end of the conducting wire. In this configuration, up/down motion is achievable, and if a ferromagnetic element around the lighting container is included along with an appropriately placed electromagnet/linear actuator, a pendulum motion may also be generated. Lastly, if the translucent container is spherical and the ferromagnetic material is not just next to the container but actually incorporated into it, the apparatus will be able to release and drop the lit sphere into the padded bucket below.

All of the embodiments discussed above can have the additional feature of either active or passive musical accompaniment. For example, music may be applied passively by programming into one of the embodiments a pattern that moves in synchronicity with a predetermined song or melody. The music can take on several forms. First, an audible frequency range could be assigned to each unit and then the pitch tied to the height of the repetitive element: i.e. as the repetitive element is pulled higher by the pulley, the pitch increases, and visa versa. In a similar fashion, a different frequency could be assigned to each repetitive element, and the repetitive element used as a volume control for the frequency. As the repetitive element goes up, so does the volume, and visa versa. It is also possible to use the apparatus as a visual equalizer, where each repetitive element has a prescribed frequency range of an external song or melody. The repetitive element would move and down according to the equalizer input from the song. The actual programming for adding music actively can be accomplished with conventional software using conventional techniques.

BRIEF DESCRIPTION OF THE DRAWINGS

In order to aid in understanding the invention, it will now be described in connection with exemplary embodiments thereof with reference to the accompanying drawings in which like numerical designations will be given to like features with reference to the accompanying drawings wherein.

DETAILED DESCRIPTION OF THE INVENTION

The embodiments of the invention described below are not intended to be exhaustive or to limit the invention to the precise structures and operations disclosed. Rather, the described embodiments have been chosen to explain the principles of the invention and its application, operation and use in order to best enable others skilled in the art to follow its teachings.

Figure 1:
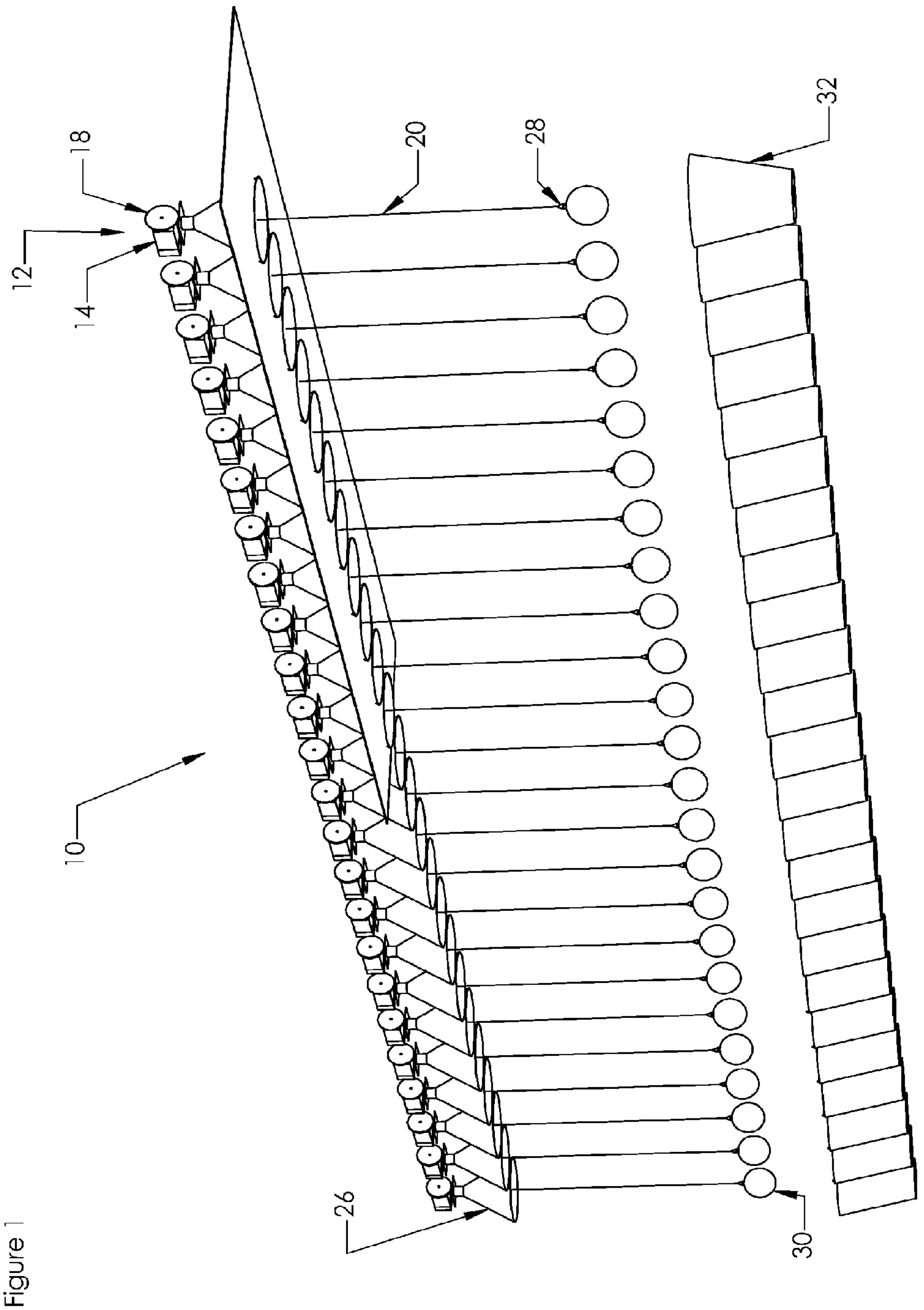
FIG. 1 is a perspective view depicting one embodiment of the apparatus of the invention at rest.
Figure 3:
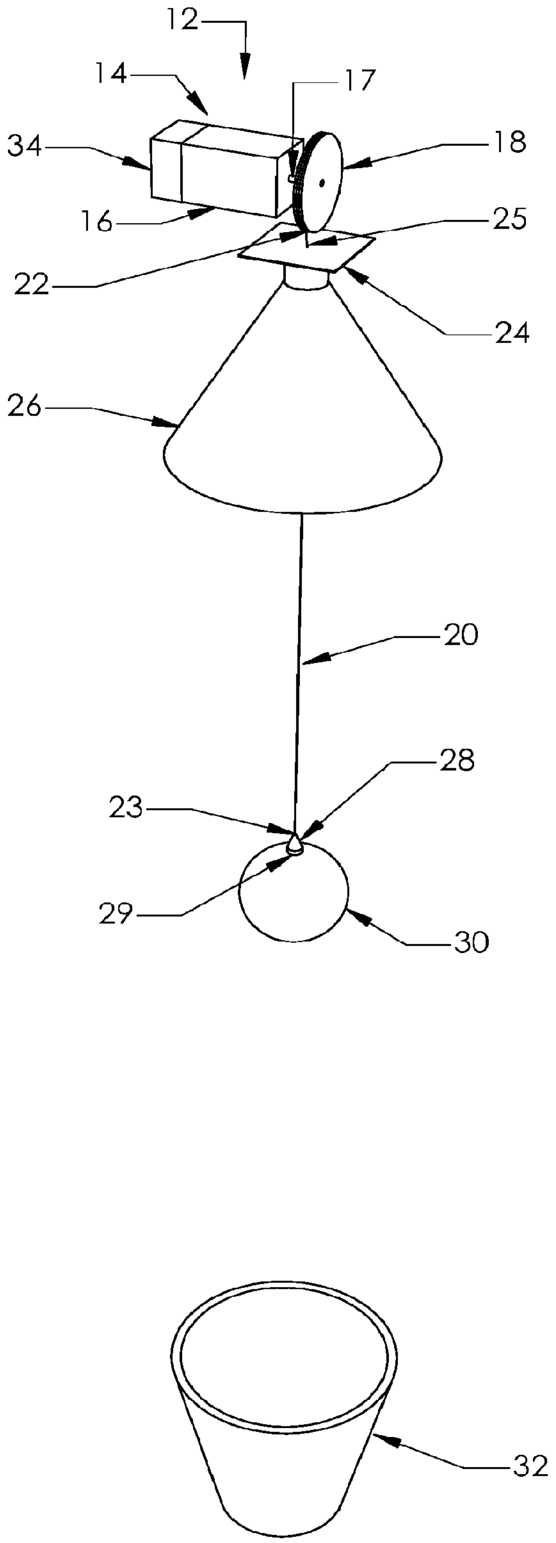
FIG. 3 is a perspective view of an individual releasing kinetic element.

Referring to FIG. 1, an apparatus for repetitively lifting and lowering objects 10 in accordance with the invention is shown. Apparatus 10 includes a plurality of kinetic releasing elements 12 (as best seen in FIG. 3) equally spaced in this embodiment in a linear pattern. Each kinetic releasing element 12 includes a top unit 14. Top unit 14 supports the remainder of the kinetic releasing element and houses a motor 16. Each kinetic releasing element also includes a rotary member in the form of a pulley 18 connected to the motor through a motor shaft 17 and a cord 20 attached at its distal end 22 to the outer circumferential edge of the pulley. Preferably, the kinetic releasing element will also include a cord guide 24, a repetitive element stabilizer 26, and an attaching mechanism 28. Movement of cord 20 is powered by motor 16 by way of pulley 18 to effect movement of a repetitive element 30 associated with attaching mechanism 28. A computer/microprocessor 34, shown diagrammatically, controls operation of the motor. Axially centered below cord 20 is a hollow upwardly directed receptacle in the form of a catch cone 32 which receives the repetitive element when it is released.

Apparatus 10 allows repetitive elements 30 to be dropped from the repetitive element stabilizer 26 into catch cone 32 when pulley 18 lifts the repetitive element into the repetitive element stabilizer 26 until the repetitive element meets the repetitive element stabilizer 26. Because attaching mechanism 28 is the only thing holding repetitive element 30 and because attaching mechanism 28 is smaller than the repetitive element 30, the attaching mechanism 28 will not run into repetitive element stabilizer 26 when the repetitive element 30 meets the repetitive element stabilizer 26. Thus, as pulley 18 continues to draw up on the cord 20, repetitive element 30 will release from attaching mechanism 28 and freefall into catch cone 32 below. Because catch cone 32 is axially aligned with cord 20, after repetitive element 30 has fallen into catch cone 32, the repetitive element can be reattached to attaching mechanism 28 by having pulley 18 lower the attaching mechanism 26 into catch cone 32, where the repetitive element came to rest. The preferred conical shape of catch cone 32 will ensure repetitive element 30 is also aligned with the axis of cord 20, ensuring proper reattachment to attaching mechanism 28.

Figure 2:
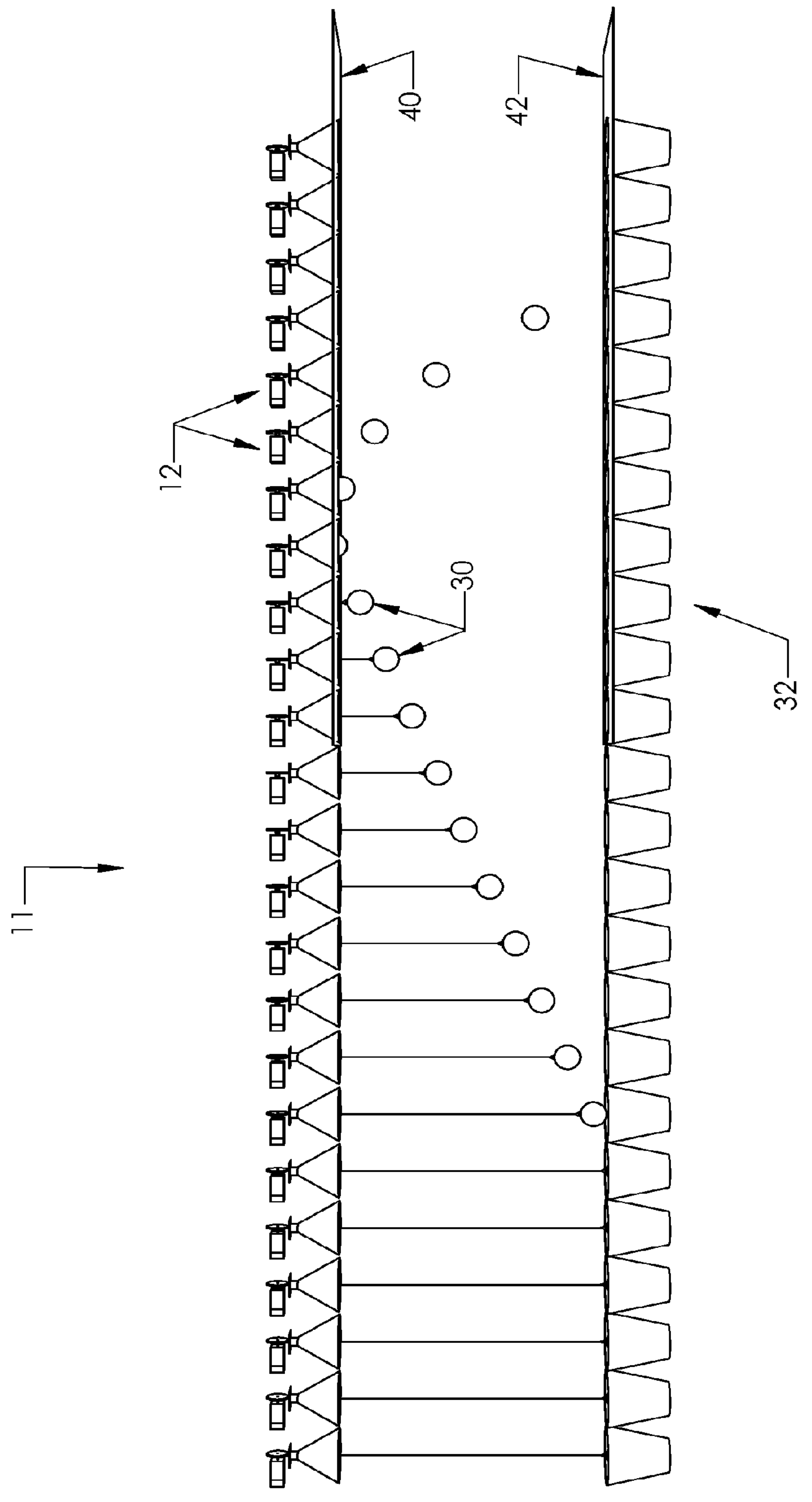
FIG. 2 is a side perspective view illustrative of the apparatus in motion.

Another embodiment of the apparatus of the invention is designated 11 in FIG. 2. In this embodiment, a partial ceiling 40 and a floor 42 have been included to demonstrate another way in which the kinetic releasing elements 12 might be placed. Additionally, FIG. 2 shows repetitive elements 30 stopped in motion at an instant in an up/down/falling pattern.

In FIG. 3, an individual kinetic releasing element 12 is shown including top unit 14 housing motor 16 which is connected to pulley 18 through a motor shaft 17. A cord 20 is attached to pulley 18 at its distal end 22 and to an attaching mechanism 28 at its proximal end 23. The lateral positioning of cord 20 is maintained by passing the cord through hole 25 of cord guide 24. The proximal end 29 of attaching mechanism 28 is attached to repetitive element 30. In FIG. 3, repetitive element 30 is shown as a spherical object or a ball, although objects of other shapes may be used.

Figure 4:
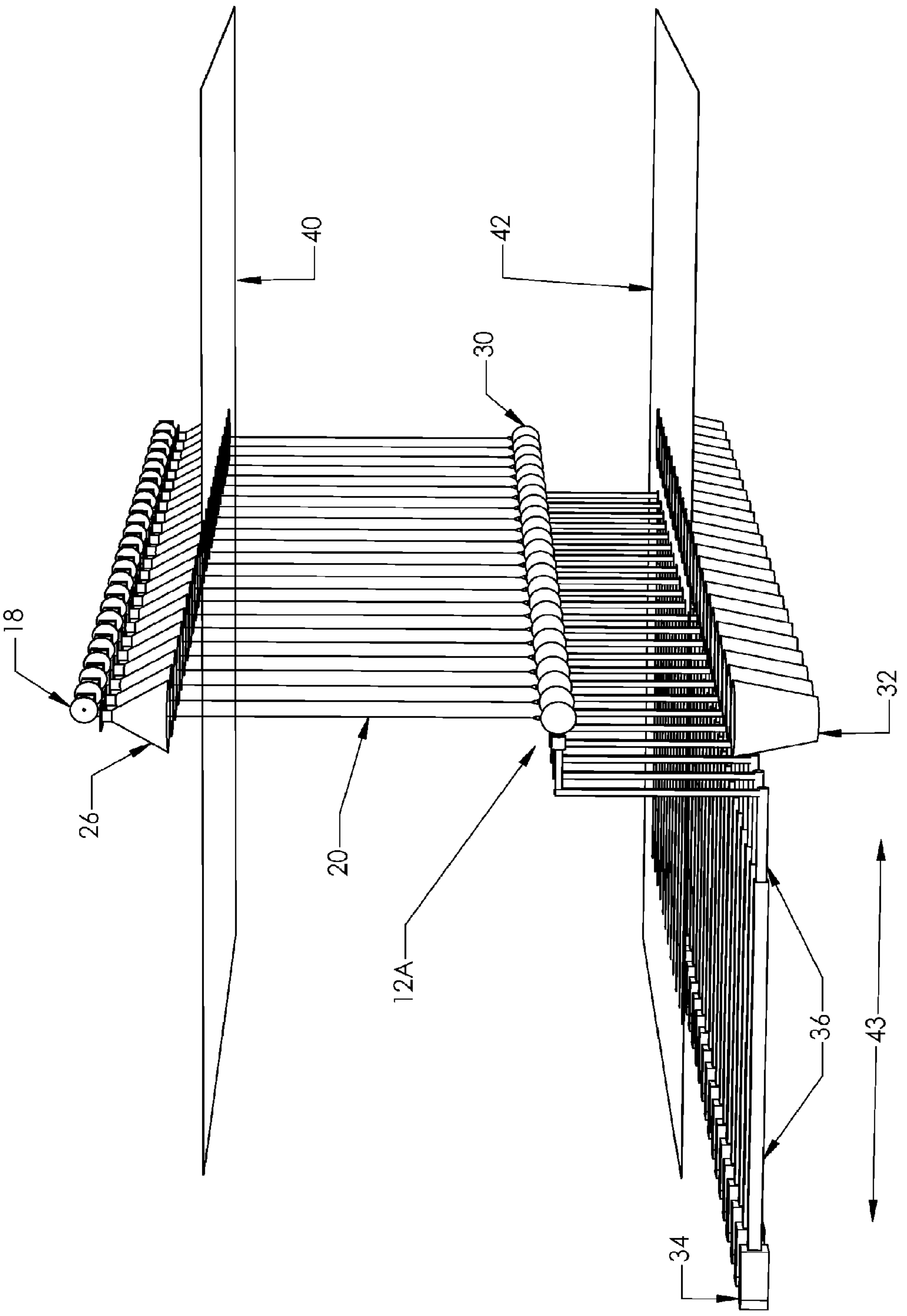
FIGS. 4 and 5 are illustrations of an alternative embodiment of the apparatus, including an electromagnet and a linear actuator associated with each repetitive element.
Figure 5:
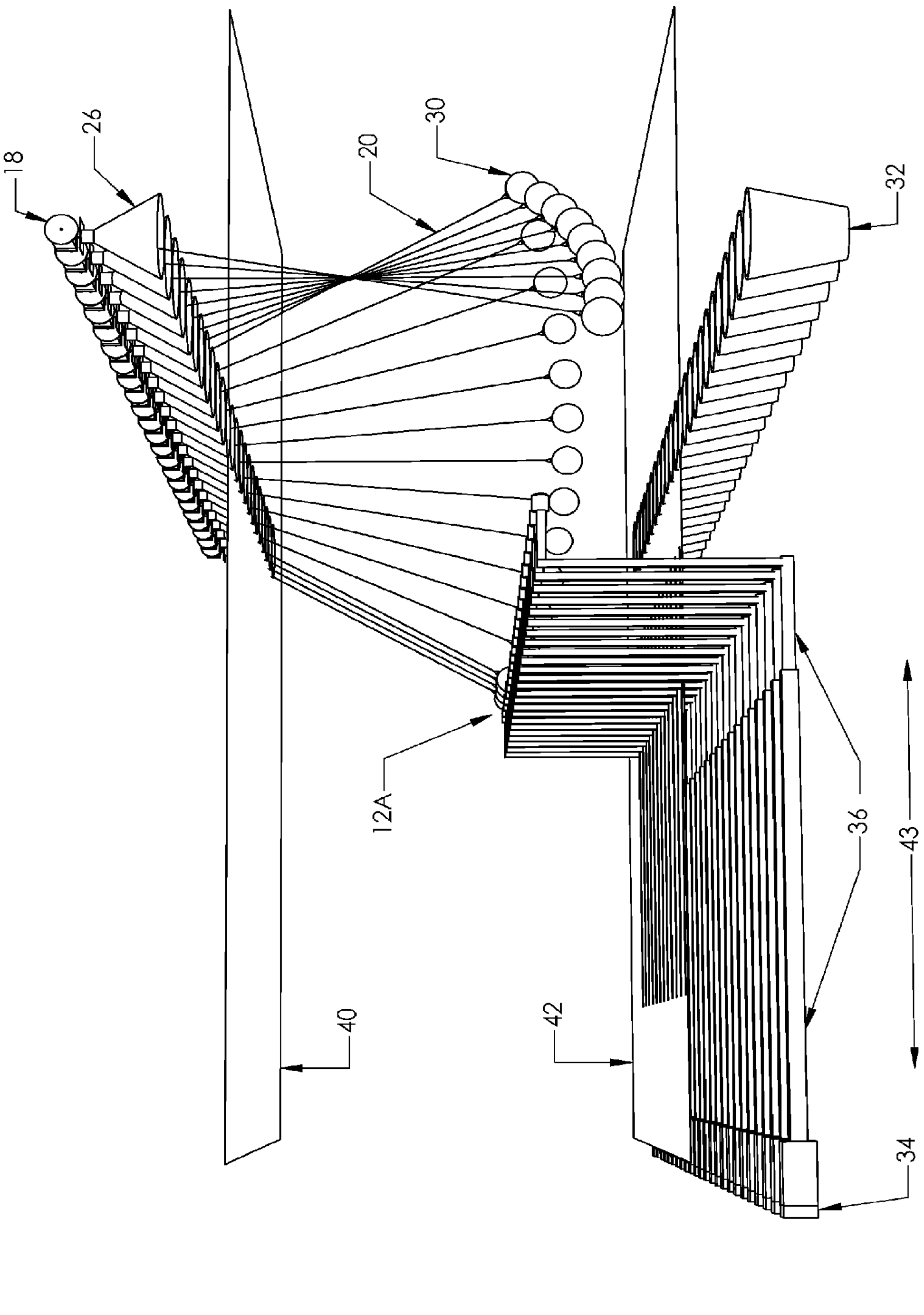
Figure 6:
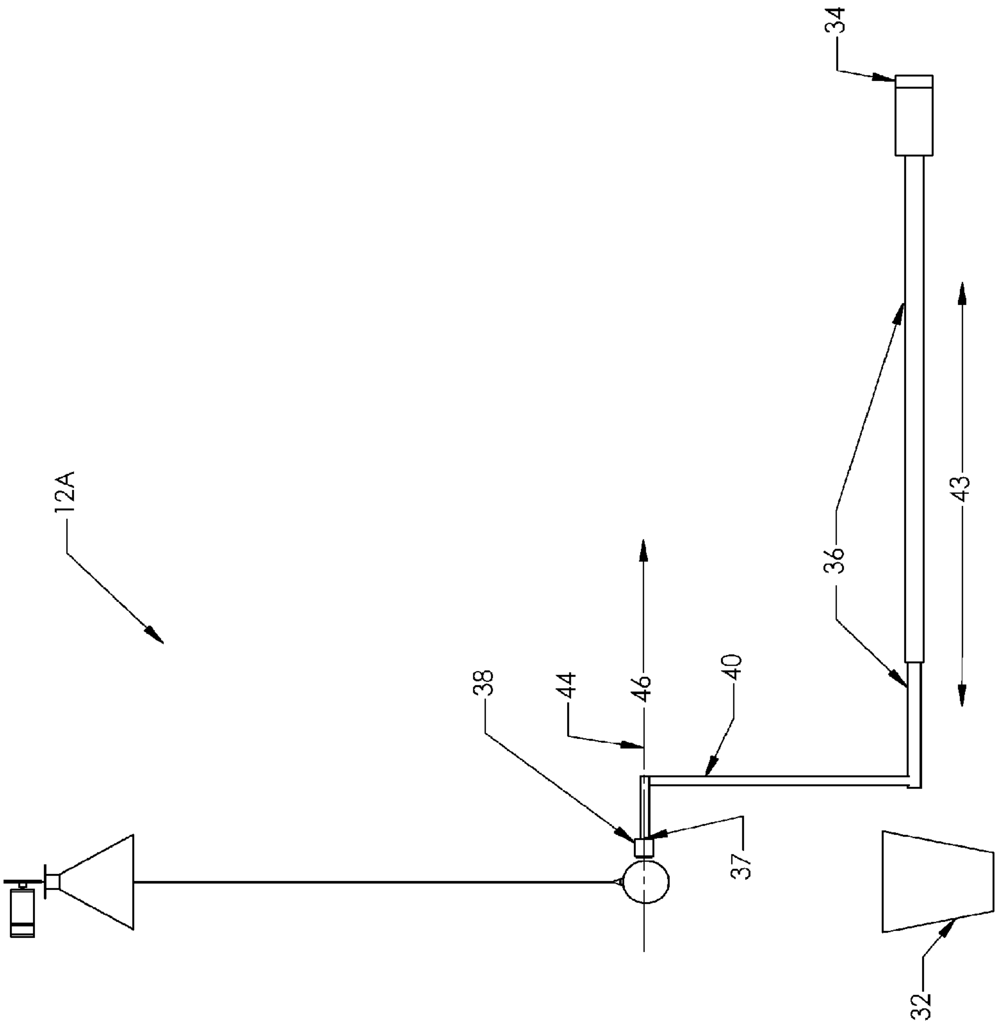
FIG. 6 is a side view of an individual swinging kinetic element.

Referring to FIGS. 4, 5, and 6, another alternative embodiment of the invention is shown in which a series of swinging kinetic releasing elements 12A are shown arranged in a linear pattern. In FIG. 6, an individual swinging kinetic releasing element 12A is shown including all of the components of the kinetic releasing element as well as a computer/microprocessor 34 (represented diagrammatically) controlling a linear actuator 36 and electromagnet 38. This embodiment is a variation on the embodiment of FIGS. 1 and 2, where repetitive element 30, in addition to being attached to attaching mechanism 28, is also attached to computer controlled electromagnet 38. Electromagnet 38 is fixed to the proximal end 37 of computer/microprocessor controlled linear actuator 36, allowing the linear actuator 36 and electromagnet 38 to be moved back and forth in the direction of travel 43.

Thus repetitive element 30 may be raised/lowered by pulley 18 such that it is aligned with the electromagnet's axis 44 and pulling direction 46, so that when the electromagnet 38 is activated, the repetitive element will attach to electromagnet 38 and remain attached until the electromagnet is deactivated. If electromagnet 38 is activated and repetitive element 30 is attached, then linear actuator 36 can retract, thereby moving the repetitive element, the attaching mechanism, and cord 20 in pulling direction 46. As linear actuator 36 is retracted, the length of cord 20 from cord guide through hole 25 to attaching mechanism 28 must increase. This length is precisely controlled by the computer/microprocessor controlled motor turning pulley 18, allowing just enough cord 20 to be released from the pulley. Once linear actuator 36 reaches its desired retraction length, electromagnet 38 will be deactivated, thereby releasing the repetitive element 30, allowing it to swing freely back and forth in a pendulum motion. Once the repetitive element 30 is released, the pendulum periodicity can be adjusted by operating pulley 18 by appropriately programming computer 34 to take in/let out cord 20.

Figure 7:
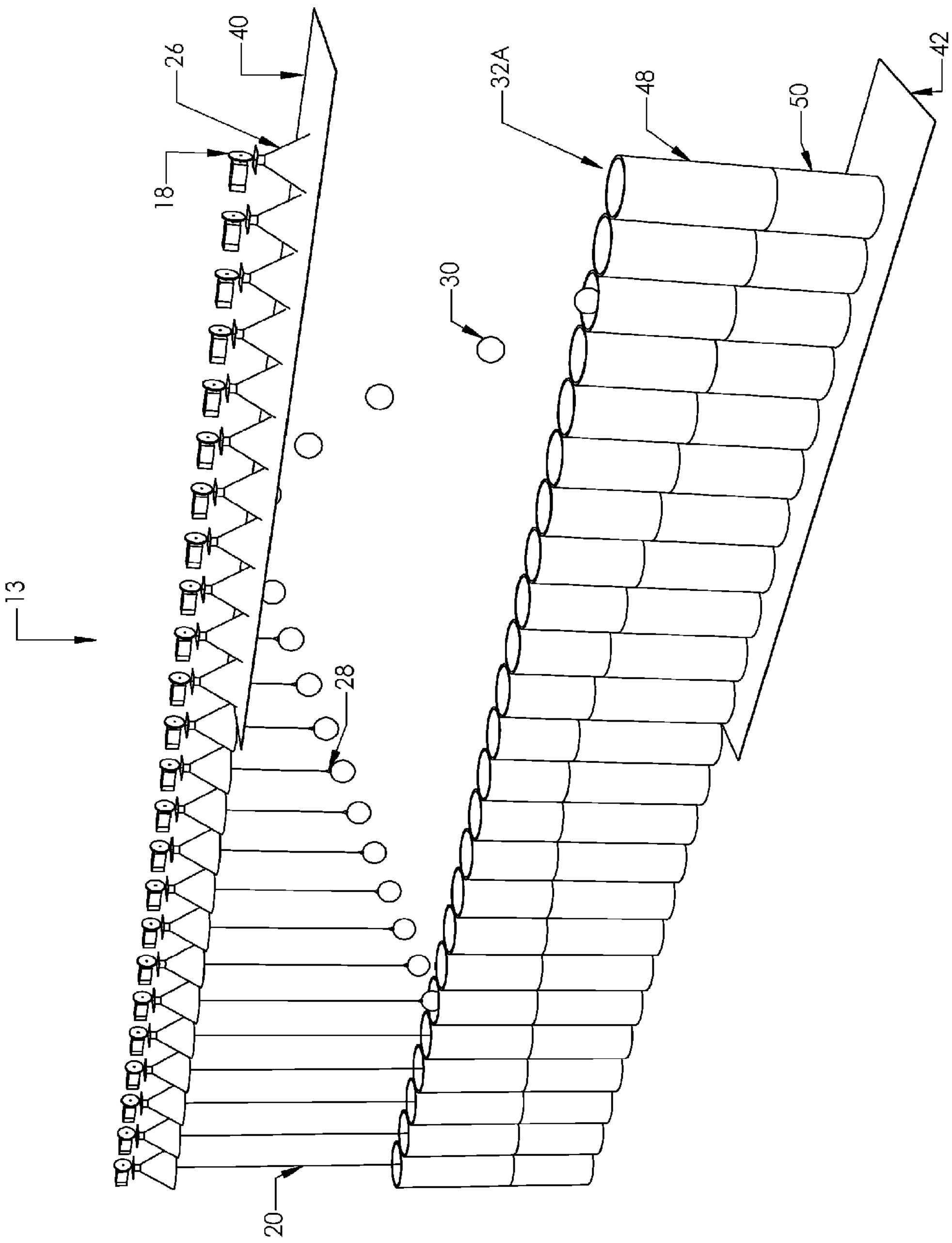
FIG. 7 is a perspective view of an alternative embodiment of the apparatus, including a catch tube associated with each repetitive element.

Another embodiment of the invention 13 is illustrated in FIG. 7. In this embodiment, the catch cone is not simply a hollow inverted cone, but a catch tube 32A, which is either translucent or opaque and partially filled with liquid such as water. Catch tube 32A consists of two sections, a hollow upper section 48 and a liquid filled lower section 50. Thus, when repetitive element 30 is released from attaching mechanism 26 and falls into catch tube 32A, a splash and tonal "plunking" sound will be generated, where the tone is dependent on the tube diameter along with liquid type and height in tube. As shown in FIG. 7, a line of catch tubes 32A can replace catch cones 32 of the previous figures. Because the liquid height may be varied from tube to tube, the tonal response from the repetitive element 30 falling into the liquid can be unique for each distinct liquid height. Additionally, by appropriately adjusting viscosity of the liquid the weight of the repetitive element 30 and the effects such as splash height and repetitive element sinking speed can be varied as desired.

Figure 8:
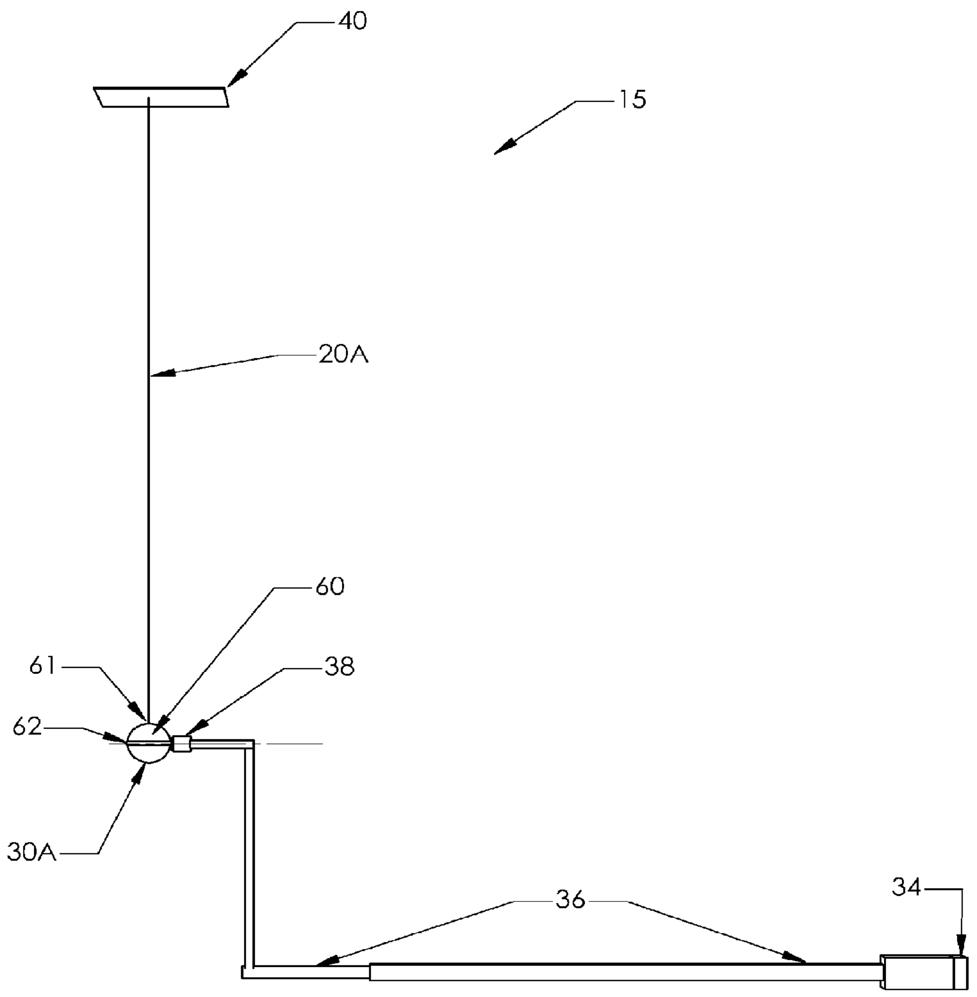
FIG. 8 is a perspective view of an individual unit of an alternative embodiment of the apparatus, including an integrated lighting element.

In yet another embodiment 15 of the invention illustrated in FIG. 8, lighting is included in the apparatus. Thus in this embodiment, a lighted repetitive element 30A acts as a pendulum whose initial position is controlled by linear actuator 36 and electromagnet 38. In this embodiment, cord 20 is replaced with a constant length electrically conducting wire 20A. This allows many different kinds of encased lights 60 to be attached at the proximal end 61 of the conducting wires. With light 60 attached (appropriately secured and encased) and a repetitive element 30 (attachable to electromagnet 38 (e.g., via a ferromagnetic ring 62 around the repetitive element)) appropriately placed next to the light, linear actuator 36/electromagnet 38 can pull back and release the light, allowing it to swing back and forth. Adding multiple units will produce a visual effect like a programmable swinging chandelier. Because the power requirement for the lighting can be kept low, the wire diameter can be kept very small, ensuring good flexibility (and invisibility from the desired viewing distance). This flexibility helps ensure that the pendulum motion is kept in the initial and intended swing plane, which may be important when multiple units are added in close proximity to each other.

Figure 9:
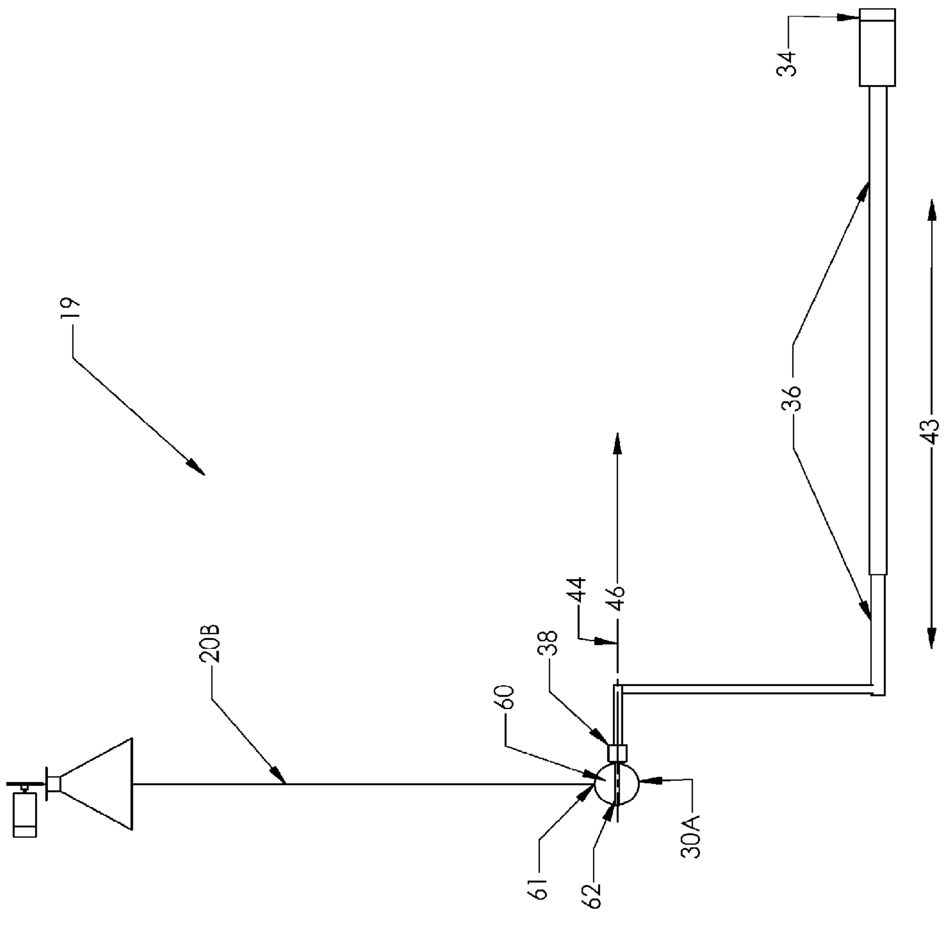
FIG. 9 is a side view of an individual unit of an alternative embodiment of the apparatus, including an integrated lighting element.

In a further alternative embodiment of the invention 19 shown in FIG. 9, a conducting wire 20B that is pre-coiled can be used. If a conducting wire that is flexible enough to be coiled/uncoiled repeatedly is used, it will allow even more interesting patterns to be created as now it is possible to change the periodicity of the swinging lights by changing the pendulum length.

Figure 10:
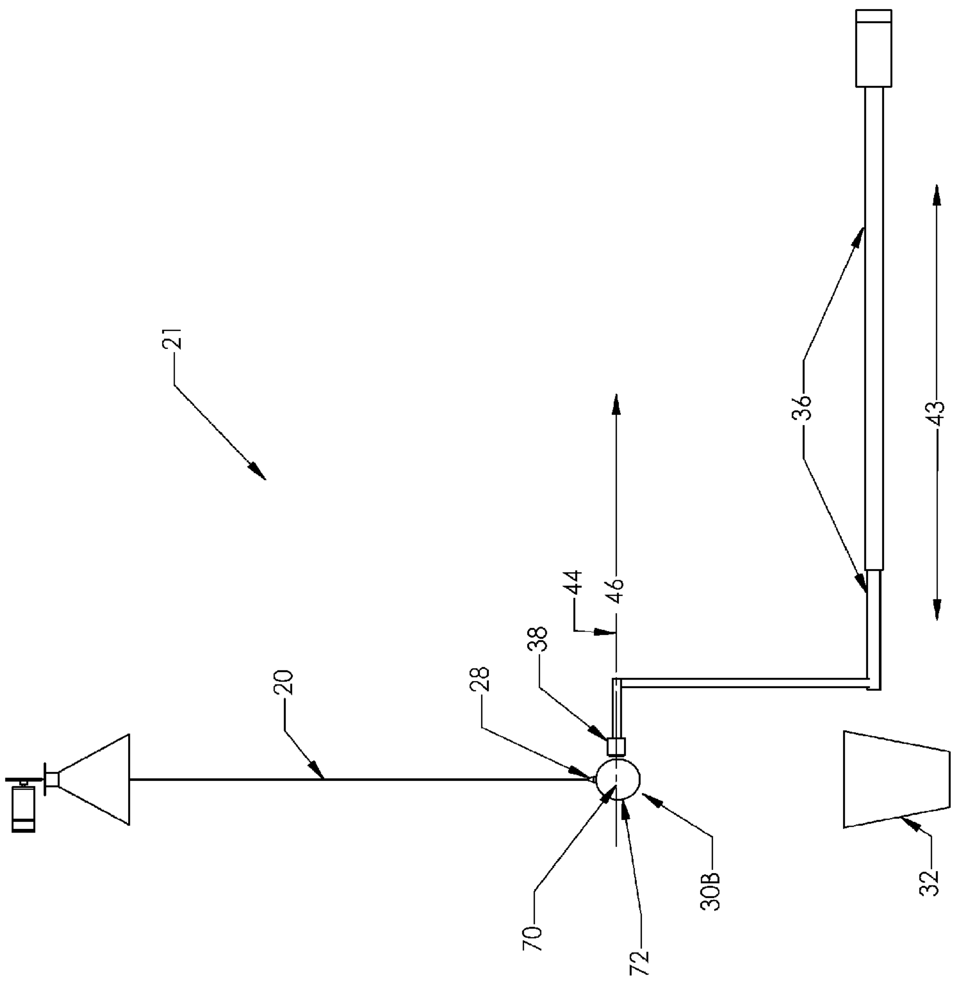
FIG. 10 is a side view of an individual unit of an alternative embodiment of the apparatus, including an integrated lighting element with a self contained light.

In still another embodiment of the invention 21 shown in FIG. 10, a low power light source 70, for example a high-output LED is encased (along with batteries to power the LED) inside a translucent container 72 at the proximal end 29 of attaching mechanism 28. Since up/down motion is achievable in this configuration, if repetitive element 30 around lighting container 72 is included along with an appropriately placed linear actuator 36/electromagnet 38, pendulum motion can be generated. Lastly, if translucent container 72 is spherical and the ferromagnetic material is incorporated into the translucent container, the apparatus will be able to release and drop lit spheres 30B into catch cone 32.

All of the embodiments discussed above can employ the additional feature of music, either actively or passively.

An example of employing music passively is to program into one of the embodiments controlled by computer 34 a pattern that moves in synchronicity with a predetermined song or melody. Adding music actively can take on several forms. First, an audible frequency range may be assigned to each unit and then the pitch controlled with the height of the repetitive elements: i.e. as repetitive element 30 is pulled higher by pulley 18, the pitch increases, and visa versa. In a similar fashion, an individual frequency can be assigned to each unit, and each repetitive element assigned a volume control for that frequency. Then, as the repetitive element goes up, so can the volume, and visa versa. This embodiment may also be used as a visual equalizer, where each repetitive element 30 has a prescribed frequency range of an external song or melody. Accordingly, each repetitive element 30 moves up and down according to the equalizer input from the song.

In all the embodiments of the invention, each kinetic releasing element 12 and swinging element 12A preferably will be computer-controlled to command the precise position of the repetitive element 30. This can be accomplished by computer controlling the motor to effect rotation of pulley 18, thereby controlling the position of the repetitive element. Thus, the computer/microprocessor will be programmed with conventional software using conventional techniques, creating a program that gives it precise control of the motor.

As an example, the programming language LabVIEW may be used to achieve the motor control (and control of linear actuator, electromagnet, lighting, and sound where appropriate) since it communicates well with external devices, such as stepper motors and other electrical devices and has functionality that allows for easy connection and communication with the stepper motors and other electrical devices. One brand of stepper motor that communicates well with LabVIEW is Ingelligent Motion Systems' MDrive Plus integrated motor and controller (See imshome.com for more information on the MDrive Plus motors). Because the motor has its controller built in (essentially a microprocessor), it is simply a matter of attaching a USB cable from the motor to the computer and installing IMS supplied drivers. Once this is completed, communication between the motor and computer can begin. Because more than one motor will be used, it is necessary also to use a cable that daisy chains from motor to motor.

Once the motors (or other electrical devices) are communicating with the computer, there are two options. If the final installation is to run without a computer, one can simply use the software supplied by IMS (called IMS Terminal) to program the microprocessor of each motor individually and then save each motor's program onto its integrated controller. Once all the motors' programs have been saved onto their respective controllers, the computer can be removed, leaving just the daisy chain cable to allow communication between the motors. Programmed this way, when power is supplied to the motors they will run and generate patterns on their own. While this is a viable approach, the onboard memory of each integrated controller is limited, thus limiting the number of patterns that can be programmed into the motors so the use of an external computer is preferred.

Thus, in a preferred alternative, the computer can remain attached to the motors via the USB cable and LabVIEW can be used to create the programs and run the patterns.

Communication between the computer and the motors' integrated controllers is accomplished with a simple command set supplied by IMS. For example, if 24 motors are labeled a, b, c, . . . , w, x, then upon sending the command "dmr 2048", motor d will move clockwise 2048 steps. Using commands like this along with the timing functionality of the LabVIEW language, programs to create patterns can be produced by anyone of ordinary skill in the art. For example, a typical LabVIEW program would start by giving all the motors the command to wake up (again, all commands given to the motor are in the command set supplied by IMS), followed by setting the acceleration, deceleration, maximum velocity, direction, etc, for each motor. Once the basic motor parameters are input, the program would proceed to command the motors to move, stop, wait, etc.

As an example, if a simple wavelike pattern is desired as in FIG. 1, motor a is directed to move at velocity v. LabVIEW is programmed to wait 100 ms and then send the command for b to move at velocity v, wait 100 ms and have c move at velocity v, etc. until 2300 ms after motor a started moving, finally causing motor x to start moving at velocity v. When each motor reaches the bottom of its movement cycle (which the program specifies), the command to return the top is given. When the motors reach the top of their movement cycle, the process is repeated. This sequenced motor start series of LabVIEW commands has the effect of generating a wave pattern with the repetitive elements 30.

Finally, when it is decided that the pattern has run long enough, a command to stop all the motors would be given. This program process would then repeat as different patterns were called by up LabVIEW. In both instances, whether the control is coming directly from the integrated controllers or from LabVIEW on a computer, it is simply a matter of sending appropriately timed move commands to each motor. At its core, the creation of patterns in any of the embodiments comes from precisely controlling the parameters of the motors controlling the pulleys and linear actuators. So, precise control over the motors of the embodiments makes it possible to generate the desired patterns.

There are different types of motors and controllers that can be used, one example being a stepper motor with an integrated controller. With an integrated controller, a set of motor commands, like direction, speed, acceleration, etc., is understood by the stepper motor and all that is necessary is to give specific values for each relevant command. For example, if pulley 18 is to pull up on a cord 20, stepper motor is given the move command, making sure to set the initial conditions of direction, acceleration, deceleration, maximum velocity, and start time. With these variables set, the move is precisely determined, ensuring extremely accurate motion every time a move command is executed. Linear actuator 36 can be controlled in the same fashion because it is a motor that controls the linear motion of the actuator.

If a stepper motor with integrated controller is used as the linear actuator 36 motor, then the actuator motion is programmed just like the pulley motor above. Once the stepper motor command set is known, it is simply a matter of getting the commands from the computer/microprocessor to the motor. This straightforward procedure may be accomplished by one of ordinary skill in the art using any programming language, by writing the code necessary for the computer/microprocessor to communicate with the stepper motors.

Additionally, integrated lighting can be controlled with the use of solid state switches and the programming of the computer/microprocessor to switch them on and off.

Finally, the optional music portion of the invention described above may be controlled on the computer/microprocessor and external speakers. Using music passively, the program simply starts the appropriate song or melody when the pattern starts. Using music actively, the initial conditions to be sent to the motors are also sent to a program that mimics the motors sonically in a fashion as described above. In one example, as repetitive element 30 is programmed to be pulled up, the music portion of the program is programmed to increase the volume for the appropriate frequency, and visa versa. One particularly good program for controlling the volume and pitch is the LabVIEW programming language, but this level of control can be gained in almost any language.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An apparatus for repetitively lifting and lowering objects to create visual patterns comprising:

a plurality of units, each unit having a motor with a shaft, a rotary member with an outer circumferential edge disposed generally perpendicularly to the axis of the shaft affixed to the shaft, and a cord attached at its distal end to a circumferential edge of the rotary member;

an attaching mechanism affixed to the proximal end of the cord of each unit;

a repetitive element removably connected to each of the attaching mechanisms; and a computer or microprocessor associated with the motor and programmed to selectively rotate the rotary members to move the repetitive elements between selected pre-determined positions along a generally vertical path of travel to establish a geometric pattern of repetitive elements.

2. The apparatus of claim 1 in which the plurality of units are arranged in a regular shape or configuration chosen from the group consisting of circular, linear, arcuate, and rectangular.

3. The apparatus of claim 1 in which the plurality of units are arranged in a geometrically irregular configuration.

4. The apparatus of claim 1 in which the computer or microprocessor is programmed to synchronize the rate of rotation of the rotary member of each unit relative to the rotary members of its adjacent units to create an illusion of direct interconnection between some or all of the plurality of repetitive elements.

5. The apparatus of claim 1 including means for providing sound of varying volume in which a sound frequency is designated for each repetitive element and the repetitive element moves synchronously with changing volume of the designated frequency.

6. The apparatus of claim 1 in which the repetitive element is ferromagnetic and includes a pivot point below the rotary member and an electromagnet attached to a linear actuator linear oriented generally perpendicularly to the cord whereby the linear actuator when turned on will cause the cord and attached repetitive element to pivot about the pivot point.

* * * * *